United States Patent [19]
Kohler et al.

[11] 3,788,712
[45] Jan. 29, 1974

[54] BEARING BUSHING FOR UNIVERSAL JOINTS

[75] Inventors: Hans-Joachim Kohler; Guido Rieder, both of Herzogenaurach, Germany

[73] Assignee: Industriewerk Schaffler, Herzogenaurach, Germany

[22] Filed: Apr. 24, 1972

[21] Appl. No.: 247,020

[30] Foreign Application Priority Data
May 7, 1971  Germany................... P 21 22 575.2

[52] U.S. Cl.................................. 308/35, 308/213
[51] Int. Cl........................ F16c 21/00, F16c 33/34
[58] Field of Search..... 308/35, 174, 213, 212, 214; 64/17 A

[56] References Cited
UNITED STATES PATENTS
2,063,787  12/1936  Brown............................... 308/174
3,589,143  6/1971  Bott.................................. 308/212

*Primary Examiner*—Charles J. Myhre
*Assistant Examiner*—Frank Susko
*Attorney, Agent, or Firm*—Hammond & Littell

[57] ABSTRACT

A bearing bushing for accommodating spider trunnions in bores in the shaft forks of a universal joint wherein the bushing has on one side a closed end for abutment of the end of the spider trunnion.

4 Claims, 1 Drawing Figure

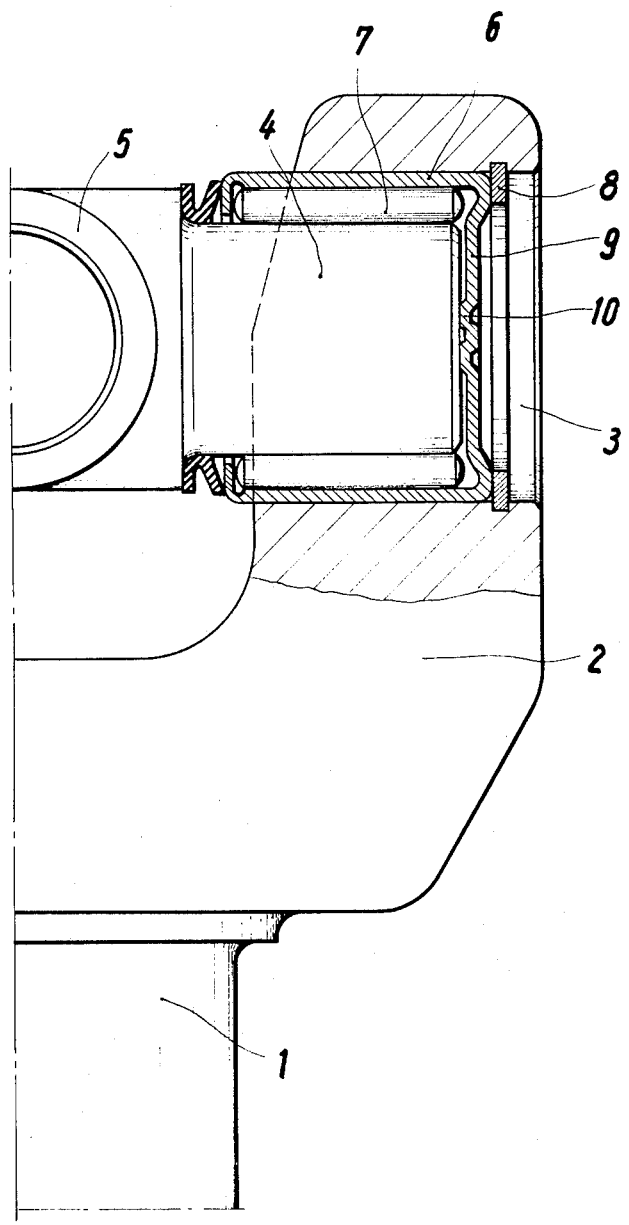

BEARING BUSHING FOR UNIVERSAL JOINTS

STATE OF THE ART

Various forms of bearing bushings of this type have been known and used for a long time with good results. The bushings can be designed as sliding bearings or as bearings wherein a plurality of rollers roll on the bore of the bearing bushing and on the surface of the trunnion of universal joint spider. One of the advantages of the latter design is that the use of the rollers provides smoother operation which is desirable and is particularly favorable in universal joints. However, the trunnions of the spider of the universal joint bear in a sliding fashion against the bottom or closed end of the bushing and this produces a considerable degree of undesirable friction. One solution to avoid this friction has been to provide an additional roller bearing between the end face of the trunnion and the closed end of the bushing but this complicated solution is only suitable for very large bushings in massive universal joints.

The undesired friction between the end face of the spider trunnion and the closed end of the bushing is particularly great since the parts are placed under initial stress during the assembly of the universal joint. The initial stress is desirable to ensure free play during operation of the universal joint even over prolonged operation periods. Because of the possible total number of tolerances during assembly, it is possible for this initial stress between the end face of the spider trunnion and the closed end of the bushing to become so great that the resulting friction will become so great that it cannot be tolerated for practical applications.

OBJECTS OF THE INVENTION

It is object of the invention to provide novel bearing bushing for universal joints to avoid excessive friction therein.

It is a further object of the invention to prevent excessive friction in a universal joint between the end faces of spider trunnions and the bearing bushing without additional mechanical means.

These and other objects and advantages of the invention will become obvious from the following detailed description.

THE INVENTION

The novel bearing bushing of the invention is comprised of a thin-walled bushing drawn from sheet metal with one closed end to abut against the end face of a spider trunnion, the center of the closed end projecting inwardly toward the trunnion end face to form the sole abutment face even with the sagging of the center to be expected during operation.

This bushing embodiment solves the problem in two ways. First, the bearing bushing is made of thin-walled, sheet metal so that the closed end of the bushing can never bear against the end face of the trunnion with excessive force during assembly even with unfavorable tolerance conditions because the closed end of the sheet metal bushing has a relatively flat spring characteristic and the force exerted by the closed end on the end face of the trunnions will increase only slightly when the bushing is forced slightly too far into the bore receiving it. Secondly, compared to other bushings of the prior art, wherein the trunnion end face abuts against the entire closed end of the bushing, the friction radius between the abutting surfaces is reduced since only the center of the closed end of the bushing abuts against the trunnion end face even allowing for the center sagging expected during operation. The greater friction radius of the prior art bushings results in a much higher degree of friction compared to the bushing of the invention. These two features each effects a considerable improvement by itself but only by their combination as in the present invention is the problem of friction truly and effectively solved.

In one embodiment of the invention, the projecting abutment center is formed by a bulge in the center of the bushing closed end which provides a substantially point-shaped abutment surface for the trunnion and the friction is reduced to the lowest possible value.

In another embodiment of the invention, the area of the bushing closed end surrounding the projecting abutment surface is substantially planar which has a desirable effect on the spring characteristics of the closed end of the bushing.

In a third embodiment of the invention, the bushing closed end is provided in the area of the projecting abutment face with at least one groove or depression for receiving lubricant to improve the lubricating conditions between the trunnion end face and the bushing closed end and this improved lubrication also reduces the friction.

Referring now to the drawing

The FIGURE is a partial cross-sectional view through a universal joint provided with a bearing bushing of the invention.

The shaft 1 of the universal joint is provided at its end with a forked arm 2 having a bore 3 therein in which is mounted a trunnion 4 of the universal joint spider 5. The trunnion 4 is accommodated by thin-walled, sheet metal bushing 6 on which needle rollers 7 roll. The bushing 6 can be fixed in bore 3 by various means such as by expanded ring 8. The closed end 9 of bushing 6 has at its center a pressed-down area 10 which forms on the bushing interior the sole abutment face for the trunnion end face. In the vicinity of the area 10, the closed end 9 of the bushing 6 is substantially planar. The distance between the interior abutment face 10 and the rest of the closed end 9 is selected so that the trunnion end face will abut only in area 10 even with the possible distrotion of closed end 9 which can occur during assembly and operation of the universal joint. The center of abutment face 10 is provided with a depression 11 for receiving lubricant.

The bearing bushing can be used in roller bearings are well as a sliding bearing wherein the bushing itself or an insert of suitable sliding properties in the bushing is the bearing surface. The size of the abutment face of the closed end of the bushing will depend upon the load and the speed that can occur in operation of the universal joint. If the bushing closed end is provided with a central bulge, the abutting face can be reduced so that practically only a point shape contact takes place.

Various other modifications of the bearing bushing of the invention may be made without departing from the spirit or scope thereof and it should be understood that the invention is to be limited only as defined in the appended claims.

We claim:

1. A bearing bushing for accommodating the trunnion of a universal joint spider comprising a thin-walled, sheet metal bushing with one closed radial end opposite the end face of a spider trunnion, the closed radial end being provided in its center with an inwardly directed projection adapted to abut against the trunnion end face.

2. A bushing of claim 1 wherein the inwardly directed projection is formed by a bulge in the closed radial end of the bushing.

3. A bushing of claim 1 wherein the closed radial end surrounding the inwarding directed projection is substantially planar.

4. A bushing of claim 1 wherein the closed radial end is provided with at least one groove or depression in the area of the inwardly directed projection for receiving lubricant.

* * * * *